(12) United States Patent
Saupe

(10) Patent No.: US 12,161,960 B2
(45) Date of Patent: Dec. 10, 2024

(54) FILTER MODULE

(71) Applicant: MAHLE International GmbH, Stuttgart (DE)

(72) Inventor: Kai Saupe, Boeblingen (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/016,327

(22) PCT Filed: Apr. 22, 2021

(86) PCT No.: PCT/EP2021/060512
§ 371 (c)(1),
(2) Date: Jan. 13, 2023

(87) PCT Pub. No.: WO2022/012792
PCT Pub. Date: Jan. 20, 2022

(65) Prior Publication Data
US 2023/0390677 A1    Dec. 7, 2023

(30) Foreign Application Priority Data

Jul. 16, 2020   (DE) ..................... 10 2020 208 934.5

(51) Int. Cl.
*B01D 35/26*  (2006.01)
*B01D 35/00*  (2006.01)

(52) U.S. Cl.
CPC ........... *B01D 35/26* (2013.01); *B01D 35/005* (2013.01); *B01D 2201/304* (2013.01);
(Continued)

(58) Field of Classification Search
CPC ................. B01D 35/26; B01D 35/005; B01D 2201/304; B01D 2201/342; B01D 2201/347; B01D 2201/4092
(Continued)

(56) References Cited

U.S. PATENT DOCUMENTS 2,741,333 A    4/1956   Dega
5,231,967 A *  8/1993   Baltz ..................... F02M 37/44
                                              123/497
(Continued)

FOREIGN PATENT DOCUMENTS

CN         1530161 A    9/2004
CN       102112194 A    6/2011
(Continued)

OTHER PUBLICATIONS

WO2020/074318A1—English Machine Translation (Apr. 2020).*
(Continued)

*Primary Examiner* — Madeline Gonzalez
(74) *Attorney, Agent, or Firm* — Fishman Stewart PLLC

(57) ABSTRACT

A filter module is disclosed. The filter module includes a pump with a pump housing and a filter device with a filter housing. A first thread is arranged on the pump housing, and a second thread configured complementary to the first thread is arranged on the filter housing, so that the pump is able to be screwed via the pump housing to the filter housing of the filter device. The pump housing includes a housing cover, a middle part and a lower part. The housing cover is screwed to the middle part and the middle part is screwed to the lower part.

20 Claims, 2 Drawing Sheets

(52) U.S. Cl.
CPC .. *B01D 2201/342* (2013.01); *B01D 2201/347* (2013.01); *B01D 2201/4092* (2013.01)

(58) Field of Classification Search
USPC .................. 210/416.5, 143, 258, 416.1, 455
See application file for complete search history.

(56) References Cited

U.S. PATENT DOCUMENTS

| | | | |
|---|---|---|---|
| 6,358,022 | B1 | 3/2002 | Frank |
| 7,166,938 | B2 | 1/2007 | Kang |
| 9,726,182 | B2 | 8/2017 | Kanazawa |
| 2014/0328708 | A1* | 11/2014 | Kasper ................... B01D 35/26 417/498 |
| 2016/0065027 | A1 | 3/2016 | Taniguchi |
| 2020/0094176 | A1 | 3/2020 | Batchelor |

FOREIGN PATENT DOCUMENTS

| | | |
|---|---|---|
| CN | 209011986 U | 6/2019 |
| DE | 616397 C | 7/1935 |
| DE | 19843021 C1 | 3/2000 |
| DE | 102008027374 A1 | 12/2009 |
| DE | 102009040655 A1 | 3/2011 |
| JP | 3910938 B2 | 4/2007 |
| JP | 2009299679 A | 12/2009 |
| JP | 2013060816 A | 4/2013 |
| JP | 2013100723 A | 5/2013 |
| WO | 2019133327 A1 | 7/2019 |
| WO | WO-2020074318 A1 * | 4/2020 ......... F04D 13/0686 |

OTHER PUBLICATIONS

Notice of Reasons for Refusal for Japanese Patent Application No. 2022-577193.
Chinese First Office Action dated Sep. 7, 2023 and Chinese Search Report dated Sep. 5, 2023 for Chinese Patent Application No. 2021800478609.
English abstract for DE-10 2009 040655.
English abstract for DE-10 2008 027374.
Japanese Notice of Reasons for Refusal dated Dec. 12, 2023 for Japanese Patent Application No. 2022-577193.
Chinese Decision on Rejection dated Jan. 2, 2024 for Chinese Patent Application No. 202180047860.9.

* cited by examiner

FILTER MODULE

CROSS-REFERENCE TO RELATED APPLICATIONS

This application claims priority to International Patent Application No. PCT/EP2021/060512 filed Apr. 22, 2021, which also claims priority to German Patent Application DE 10 2020 208 934.5 filed Jul. 16, 2020, the contents of each of which is hereby incorporated by reference in its entirety.

TECHNICAL FIELD

The present invention relates to a filter module having a pump with a pump housing and having a filter device with a filter housing.

BACKGROUND

From DE 10 2009 040 655 A1 a generic filter module is known having a pump with a pump housing and having a filter device with a filter housing. A first thread is arranged on the pump housing, and a second thread, configured in a complementary manner thereto, is arranged on the filter housing, so that the pump is able to be screwed to the filter housing of the filter device by means of its pump housing.

From DE 10 2008 027 374 A1 and DE 198 43 021 C1 further filter modules are known.

Filter modules are already in use in a varied manner and offer the great advantage of a compact method of construction, as alongside an actual filter device, additionally also a pump is housed in the filter module. Purely theoretically, of course also still further components, such as for example a heat exchanger, can be a component part of the filter module.

In order here to connect the individual components reliably and, at the same time, tightly to one another, hitherto for example a pump is mounted on the filter housing of the filter device by means of corresponding screws, or vice versa, which requires a not to be underestimated effort with regard to installation and sealing.

The present invention is therefore concerned with the problem of indicating an improved or at least an alternative embodiment for a filter module of the generic type, which is distinguished in particular by a simplified connection between a pump housing and a filter housing.

This problem is solved according to the invention by the subject of the independent claim(s). Advantageous embodiments are the subject of the dependent claims.

SUMMARY

The present invention is based on the general idea, in a filter module comprising a pump and a filter device, of not connecting a pump housing by means of separate screws, but rather by means of a screw connection arranged on the pump housing with a screw connection, configured in a complementary manner thereto, and arranged on the filter housing, so that a fixing of the pump housing on the filter housing by a simple screwing in of the pump housing and hence of the pump into a corresponding thread of the filter housing is made possible. Hereby, not only are the separate fastening means, such as screws for example, dispensed with, whereby the variety of parts and also the storage and logistics costs connected therewith can be reduced, but at the same time a manually simple installation can take place without further aids, such as tools for example, which in addition can be brought about by a single worker. Compared to pumps screwed to the filter hitherto by means of separate screws, a distinct simplification and cost reduction can be created by the solution according to the invention.

Expediently, the first thread is an external thread, whereas the second thread is an internal thread, configured in a complementary manner thereto. The external thread is arranged here for example on the pump housing, whereas the associated internal thread is arranged on the filter housing, so that a connection of the pump to the filter device by a simple screwing-in of the pump via its pump housing into the filter housing is made possible.

According to the invention, the pump housing has a housing cover, a middle part and a lower part, wherein the housing cover is screwed to the middle part, and the middle part is screwed to the lower part. In this way, a three-part pump housing can be created, which at the same time makes it possible to separate different working spaces within the pump housing. Through the division of the pump housing into three individual sections, purely theoretically also a distinctly greater flexibility can be achieved in that for example with a higher necessary pump output, the middle part can be enlarged and then a more powerful drive device, for example a more powerful electric motor, can be arranged therein. At the same time, such a multi-part pump housing enables a simple opening thereof and an easy access, for example for maintenance purposes. For screwing, for example self-tapping screws can be used here, wherein purely theoretically of course also screws with nuts as counter-bearing are also conceivable.

In a further advantageous embodiment of the solution according to the invention, the first thread is configured as an external thread and, at the same time, is configured in one piece with the lower part of the pump housing. Additionally or alternatively, provision can also be made that the second thread is configured as an internal thread and, at the same time, is configured in one piece with the filter housing. Hereby, a manufacture both of the first thread and also of the second thread for example in a plastic injection moulding tool is possible, whereby not only a high-quality but, at the same time, also economical producing of the first and second thread are possible.

In a further advantageous embodiment of the filter module according to the invention, the middle part and the lower part surround a motor compartment in which an electric motor with rotor and stator is arranged. Ideally, the middle part and the lower part thus encapsulate the drive arrangement, here the electric motor, whereby the latter can be arranged in a manner protected from fluid.

Expediently, an outwardly open annular groove is arranged on the lower part, in which a sealing ring is arranged. Such a sealing ring can be configured for example as a conventional O-sealing ring and can thereby be produced economically and in almost any desired embodiment. By means of the outwardly open annular groove in the lower part of the pump housing, in addition a predefined position of the sealing ring can be enforced, whereby an unintentional and also undesired shifting of the sealing ring during installation, i.e. on screwing in of the pump housing into the filter housing, can be reliably prevented and thereby a reliable tight connection between the pump housing and the filter housing can be created.

In a further advantageous embodiment of the solution according to the invention, a depth stop in the form of an annular step is arranged on the lower part. On the filter housing, an axial stop, configured in a complementary manner to the depth stop, is arranged, on which the lower part lies in correctly installed state with its depth stop. By the depth stop and the axial stop, a predefined installation position can thus be indicated haptically.

Expediently, the filter housing and the lower part delimit a pump chamber in which a pump wheel of the pump is arranged. This enables a comparatively simple exchange, due to wear for example, of the pump wheel, as in this case only the pump housing with its lower part has to be unscrewed from the filter housing and thereby already an access to the pump wheel is provided. Through the simple unscrewing of the lower part from the filter housing, a maintenance effort can also be distinctly reduced.

In a particularly advantageous embodiment of the filter module according to the invention, the first and the second thread are configured as a left-hand thread. Hereby, for example, a type of key-lock principle can be realised, which enables only the screwing in of an authorised pump into the filter housing of the filter module, whereas other pump housings, which for example have a right-hand thread, can not be coupled to the filter device of the filter module. Of course, still further key-lock principles are also conceivable which permit an inserting exclusively of a respectively associated and authorised pump housing into the associated filter housing.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically.

DETAILED DESCRIPTION

Figure 1:
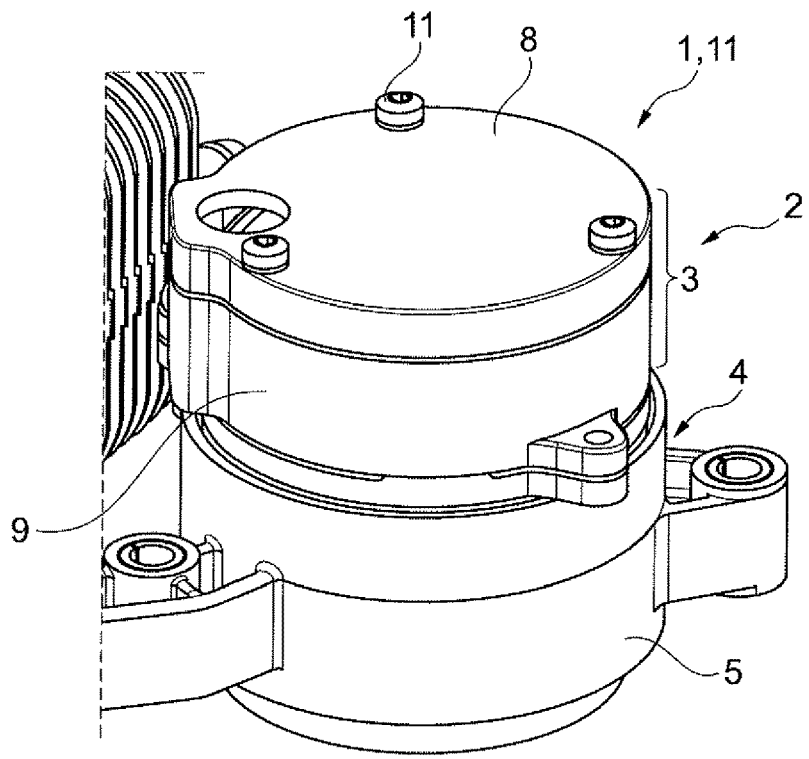
FIG. 1 a filter module according to the invention, in installed state.
Figure 2:
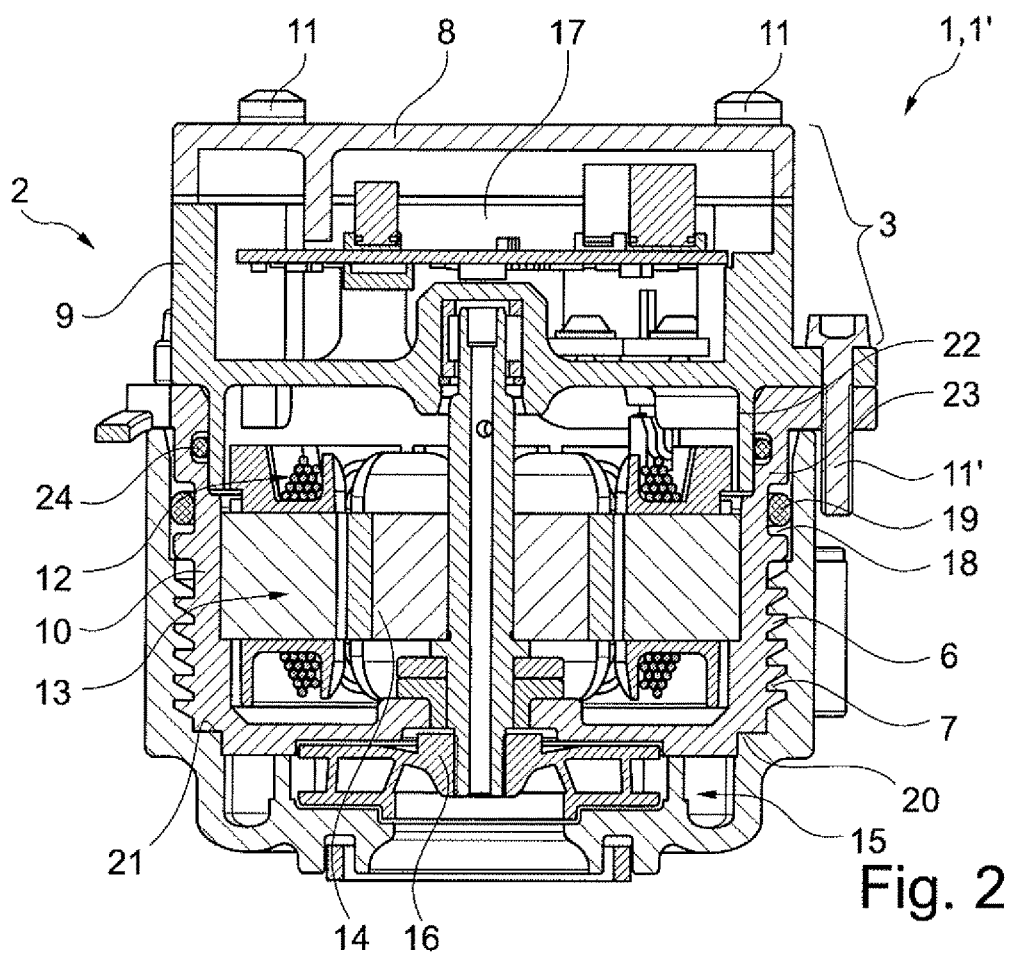
FIG. 2 a sectional illustration through the filter module according to the invention, FIG. 3 an interior view onto the filter housing with second thread arranged therein, FIG. 4 a view onto a pump with first thread arranged on a pump housing.

According to FIGS. 1 and 2, a filter module 1 according to the invention, which can be configured for example as oil filter module 1', has a pump 2 with a pump housing 3, and a filter device 4 with a filter housing 5. According to the invention, a first thread 6 is now arranged on the pump housing 3 (cf. FIG. 4), and a second thread 7, configured in a complementary manner thereto is arranged on the filter housing 5, so that the pump 2 can be easily screwed to the filter housing 5 of the filter device 4 by means of its pump housing 3 and the first thread 6 arranged thereon. The first thread 6 here is an external thread, whereas the second thread 7 is an internal thread configured in a complementary manner thereto.

By means of the first and second thread 6, 7, compared to solutions hitherto in which a pump had to be screwed to a corresponding filter device by means of separate screws, a connection possibility is provided which is extremely simple, as it is to be fastened intuitively, and which in addition requires no further fastening means, namely screws, and can thereby be configured in an economical manner.

Observing the pump housing 3 more closely, it can be seen that the latter has a housing cover 8, a middle part 9 and a lower part 10, and thereby is composed from three housing parts 8, 9, 10. In the present case, the first thread 6 is arranged on the lower part 10.

A connection between the housing cover 8 and the middle part 3 takes place here by means of screws 11, wherein a connection of the middle part 9 and of the lower part 10 likewise takes place by means of screws 11' (cf. FIG. 2). Hereby, a simple installation and, at the same time, also a simple dismantling, of the individual parts 8, 9, 10 to or respectively from one another, for example for maintenance purposes, can be achieved.

Figure 4:
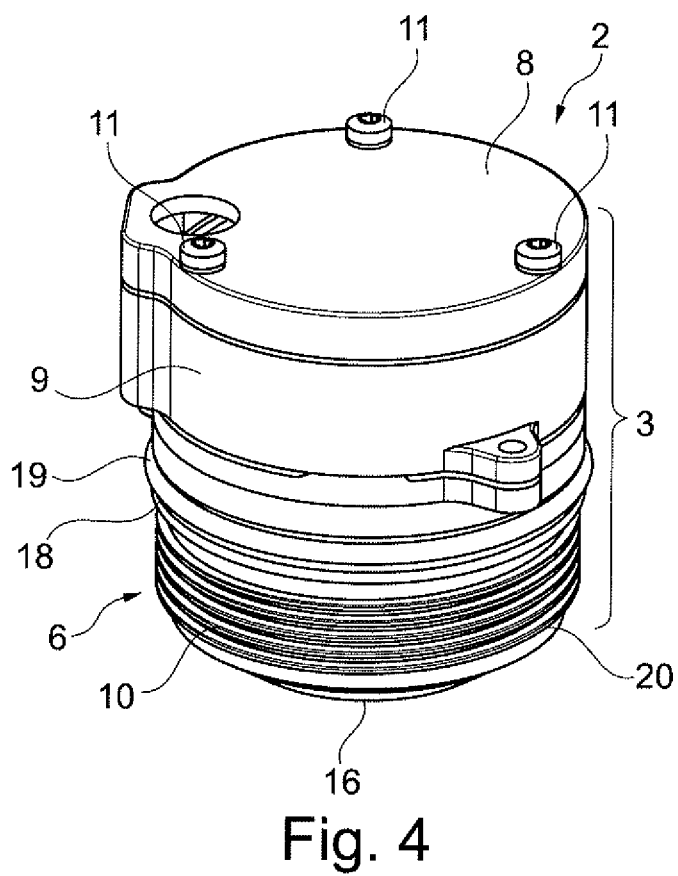

Observing FIGS. 2 and 4, it can be seen that the first thread 6 is configured as an external thread and, at the same time, is configured in one piece with the lower part 10. The second thread 7 is configured as an internal thread and preferably in one piece with the filter housing 5. The one-piece configuration of the threads 6, 7 with the lower part 10 or respectively with the filter housing 5 enables an economical and, at the same time, high-quality production of the components as plastic injection moulding parts, wherein of course also different material pairings are conceivable, so that for example the lower part 10 with the first thread 6 arranged thereon and configured in one piece is configured as a plastic part or as a metal part, and the filter housing 5 with the second thread 7 arranged in one piece thereon is configured as a metal part or as a plastic part.

The middle part 9 and the lower part 10 surround a motor compartment 12 here (cf. FIG. 2), in which an electric motor 13 with a rotor 14 is arranged. A stator is also arranged here in the motor compartment 12. The middle part 9 and the lower part 10 enable here an encapsulating of the motor compartment 12, whereby the electric motor 13 which is arranged therein is arranged in a protected manner, in particular protected from an undesired entry of fluid.

The filter housing 5 and the lower part 10 of the pump 2 delimit a pump chamber 15 (cf. FIG. 2), in which a pump wheel 16, which is connected to the rotor 14 of the electric motor 13 in a non-rotatable manner, is arranged. If thus for example the pump wheel 16 is to be exchanged owing to signs of wear, only the pump 2 must be unscrewed from the filter housing for maintenance, whereby an access to the pump wheel 16 is created directly.

The housing cover 8 and the middle part 9 of the pump housing 3 delimit a control chamber 17 (cf. FIG. 2) in which for example an electronic control of the pump 2 and electrical connections are arranged. The pump chamber 2 is sealed here with respect to the motor compartment 12 and of course furthermore also with respect to the pump chamber 15.

Observing the lower part 10 according to FIG. 4, it can be seen that it has an outwardly open annular groove 18 (cf. also FIG. 2), in which a sealing ring 19, for example an O-ring seal, can be arranged. Hereby, a reliable arrangement of the sealing ring 19, fixed in position, is provided, so that the latter can not slip in an undesired manner during screwing of the pump housing 3 into the filter housing 5.

Figure 3:
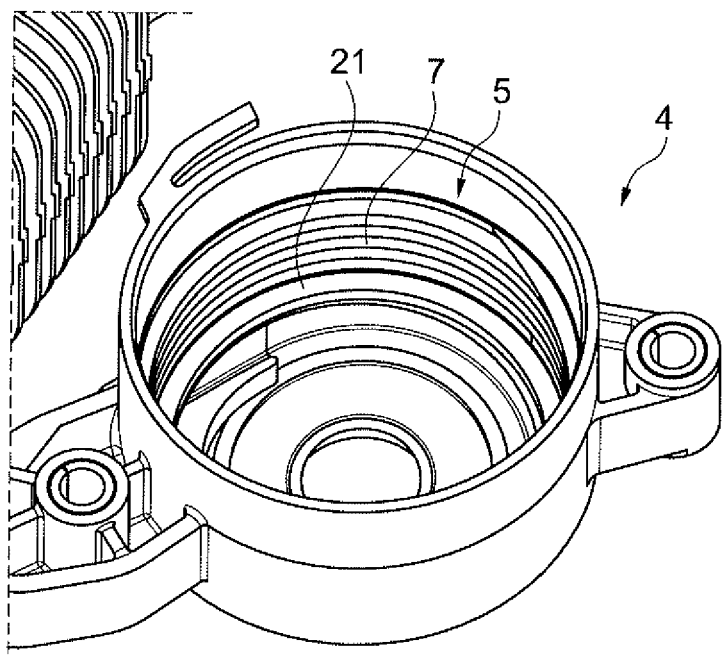

At the lower part 10, furthermore, a depth stop 20 in the form of an annular step (cf. FIGS. 2 and 4) is arranged, whereas on the filter housing 5 an axial stop 21 (cf. FIGS. 2 and 3) configured in a complementary manner to the depth stop 20, is arranged, on which the lower part 10 lies in correctly installed state, ie. in the installation state. Hereby, an installation end position can be detected haptically by an appropriate worker, whereby a reliable installation can be achieved.

The middle part 9 can possess, furthermore, an axial first annular flange 22, via which it is pushed into a second annular flange 23 of the lower part 10, configured in a complementary manner thereto. Between the two annular flanges 22 and 23, furthermore an O-ring seal 24 (cf. FIG. 2) is arranged, which seals the motor compartment 12 with respect to the exterior. By the two annular flanges 22 and 23, a reliable and simple installation can be guaranteed, as these serve as guidance aids.

In order to be able to guarantee, in addition, that exclusively an authorised pump 2 is inserted into the filter housing 5 of the filter module 1, a key-lock system can also be created, which for example can be formed in that the first and second thread 6, 7 are configured as a left-hand thread.

All in all, with the filter module 1 according to the invention, a distinctly simpler fastening of the pump 2 to the filter device 4 can be created, compared to screw connections hitherto.

The invention claimed is:

1. A filter module, comprising:
a pump including a pump housing;
a filter device including a filter housing;
a first thread arranged on the pump housing, and a second thread configured complementary to the first thread arranged on the filter housing, so that the pump is able to be screwed via the pump housing to the filter housing of the filter device;
wherein the pump housing further includes a housing cover, a middle part and a lower part, and wherein the housing cover is screwed to the middle part and the middle part is screwed to the lower part; and
wherein the filter housing and the lower part delimit a pump chamber, and a pump wheel is arranged in the pump chamber between the filter housing and the lower part.

2. The filter module according to claim 1, wherein the first thread is an external thread and the second thread is an internal thread.

3. The filter module according to claim 1, wherein at least one of:
the first thread is configured in one piece with the lower part, and
the second thread is configured in one piece with the filter housing.

4. The filter module according to claim 1, wherein the middle part and the lower part surround a motor compartment, and wherein an electric motor with a rotor is arranged in the motor compartment.

5. The filter module according to claim 4, wherein on the lower part an outwardly open annular groove is arranged, and wherein a sealing ring is arranged in the outwardly open annular groove.

6. The filter module according to claim 4, wherein the housing cover and the middle part delimit a control chamber, and wherein an electronic control of the pump is arranged in the control chamber.

7. The filter module according to claim 1, wherein on the lower part an outwardly open annular groove is arranged, and wherein a sealing ring is arranged in the outwardly open annular groove.

8. The filter module according to claim 7, wherein:
on the lower part a depth stop structured as an annular step is arranged, and
on the filter housing, an axial stop configured complementary to the depth stop is arranged, on which the lower part lies in correctly installed state.

9. The filter module according to claim 8, wherein the middle part has an axial first annular flange, via which the middle part is pushed into a second annular flange of the lower part that is configured complementary to the first annular flange, wherein an O-ring seal is arranged between the first annular flange and the second annular flange.

10. The filter module according to claim 1, wherein:
on the lower part a depth stop structured as an annular step is arranged, and
on the filter housing, an axial stop configured complementary to the depth stop is arranged, on which the lower part lies in correctly installed state.

11. The filter module according to claim 1, wherein the housing cover and the middle part delimit a control chamber, and wherein an electronic control of the pump is arranged in the control chamber.

12. The filter module according to claim 1, wherein the middle part has an axial first annular flange, via which the middle part is pushed into a second annular flange of the lower part that is configured complementary to the first annular flange, wherein an O-ring seal is arranged between the first annular flange and the second annular flange.

13. The filter module according to claim 1, wherein at least one of:
the filter module is configured as an oil filter module, and
the first thread and the second thread are configured as a left-hand thread.

14. The filter module according to claim 1, wherein the first thread is disposed on the lower part and the second thread is disposed on the filter housing.

15. The filter module according to claim 14, wherein the filter housing is secured to the lower part without a separate fastener.

16. The filter module according to claim 1, wherein the middle part and the lower part surround a motor compartment, and an electric motor with a rotor is arranged in the motor compartment, and wherein the first thread and the second thread are disposed radially outwards of and surround the motor compartment.

17. The filter module according to claim 1, wherein the housing cover and the middle part are secured by a separate screw connection than the middle part and the lower part.

18. The filter module according to claim 1, wherein the first thread is helical and extends about the lower part.

19. A filter module, comprising:
a pump including a pump housing;
a filter device including a filter housing;
a first thread arranged on the pump housing, and a second thread configured complementary to the first thread arranged on the filter housing, so that the pump is able to be screwed via the pump housing to the filter housing of the filter device;
wherein the pump housing further includes a housing cover, a middle part and a lower part, and wherein the housing cover is screwed to the middle part and the middle part is screwed to the lower part;
wherein the middle part and the lower part surround a motor compartment, and an electric motor with a rotor is arranged in the motor compartment, and wherein the first thread and the second thread are disposed radially outwards of and surround the motor compartment.

20. The filter module according to claim 19, wherein the filter housing and the lower part delimit a pump chamber, and wherein a pump wheel is arranged in the pump chamber.

\* \* \* \* \*